US009659332B2

(12) United States Patent
Tokuda et al.

(10) Patent No.: US 9,659,332 B2
(45) Date of Patent: May 23, 2017

(54) GRID CONTROLLER FOR USE IN SMART GRID SYSTEM, SMART GRID SYSTEM INCLUDING THE SAME, AND METHOD OF CONTROLLING SMART GRID SYSTEM

(71) Applicant: KAWASAKI JUKOGYO KABUSHIKI KAISHA, Kobe-shi, Hyogo (JP)

(72) Inventors: Noriaki Tokuda, Kobe (JP); Yoshinari Yamaguchi, Kobe (JP); Tomoaki Takebe, Kobe (JP); Yusuke Yamamoto, Nishinomiya (JP); Kenji Takeda, Nishinomiya (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 426 days.

(21) Appl. No.: 14/369,244

(22) PCT Filed: Dec. 19, 2012

(86) PCT No.: PCT/JP2012/008105
§ 371 (c)(1),
(2) Date: Jun. 27, 2014

(87) PCT Pub. No.: WO2013/099156
PCT Pub. Date: Jul. 4, 2013

(65) Prior Publication Data
US 2014/0379151 A1    Dec. 25, 2014

(30) Foreign Application Priority Data

Dec. 27, 2011    (JP) ................................ 2011-285956

(51) Int. Cl.
*G06Q 50/06*    (2012.01)
*H02J 3/32*    (2006.01)
(Continued)

(52) U.S. Cl.
CPC ............. *G06Q 50/06* (2013.01); *G05B 15/02* (2013.01); *H02J 3/32* (2013.01); *H02J 3/382* (2013.01); *H02J 4/00* (2013.01); *Y02E 70/30* (2013.01)

(58) Field of Classification Search
None
See application file for complete search history.

(56) References Cited

U.S. PATENT DOCUMENTS

| 8,429,435 B1* | 4/2013 | Clayton | ................. H04L 12/10 700/19 |
| 2003/0085731 A1* | 5/2003 | Iwase | ............... G01R 31/31701 326/16 |
| 2005/0270859 A1* | 12/2005 | Kato | .................... G11C 29/025 365/189.05 |

(Continued)

FOREIGN PATENT DOCUMENTS

| JP | A-2002-17044 | 1/2002 |
| JP | A-2006-94648 | 4/2006 |

(Continued)

OTHER PUBLICATIONS

International Search Report issued in International Patent Application No. PCT/JP2012/008105 dated Mar. 19, 2013.

*Primary Examiner* — Tuan Dao
(74) *Attorney, Agent, or Firm* — Oliff PLC

(57) ABSTRACT

A grid controller is communicably connected to controllers of a plurality of power storage units. The grid controller: obtains transmission power transmitted from the smart grid system to an external power system, the transmission power being a sum of electric power generated by power generating units, electric power consumed by loads in the smart grid system, and electric power charged into and discharged from the power storage units; calculates differential power between the transmission power and a smoothing operation output, the smoothing operation output being obtained by performing smoothing operation on the transmission power by using a smoothing filter; and performs control of smooth- (Continued)

ing the transmission power by performing allocation of the differential power of the transmission power in accordance with a charge-discharge state of each of power storage parts of the plurality of power storage units.

10 Claims, 8 Drawing Sheets

(51) Int. Cl.
  *H02J 3/38* (2006.01)
  *G05B 15/02* (2006.01)
  *H02J 4/00* (2006.01)

(56) References Cited

U.S. PATENT DOCUMENTS

| | | | | |
|---|---|---|---|---|
| 2007/0005192 A1* | 1/2007 | Schoettle | ................ | H02J 9/062 700/286 |
| 2011/0254377 A1* | 10/2011 | Wildmer | ............... | B60L 11/182 307/104 |
| 2012/0043889 A1* | 2/2012 | Recker | ............... | H05B 33/0815 315/86 |
| 2012/0074116 A1* | 3/2012 | Matthews | ............ | B23K 9/1006 219/133 |

FOREIGN PATENT DOCUMENTS

| | | |
|---|---|---|
| JP | A-2008-259357 | 10/2008 |
| JP | A-2009-268247 | 11/2009 |
| JP | A-2010-22122 | 1/2010 |
| WO | WO 2011/016273 A1 | 2/2011 |

* cited by examiner

GRID CONTROLLER FOR USE IN SMART GRID SYSTEM, SMART GRID SYSTEM INCLUDING THE SAME, AND METHOD OF CONTROLLING SMART GRID SYSTEM

TECHNICAL FIELD

The present invention relates to a grid controller for use in a smart grid system, a smart grid system including the same, and a method of controlling the smart grid system.

BACKGROUND ART

In recent years, from the standpoint of environmental considerations, it has been planned in various fields to construct a smart grid system that collectively manages, for example, an energy-efficient infrastructure and a next-generation power grid (i.e., a smart grid). The smart grid system forms a smart community on the scale of a municipality or a certain regional area. In the smart grid system, ordinary houses, public facilities, buildings, factories, etc., are connected to one another via a power grid. In such a smart grid system, a distributed power supply utilizing renewable energy, such as solar power or wind power, is assumed to be incorporated as a power generating unit. In the case of generating electric power by utilizing renewable energy as an energy source, the amount of instantaneous power to be generated is affected by changes in weather and the like. Therefore, if such renewable energy is introduced in the smart community in a large amount, it greatly affects an external power system (a conventional electric power transmission system relying on, for example, thermal power generation) that transmits electric power to and receives electric power from the smart community, and consequently, the electric power transmission system becomes unstable. Moreover, the status of use of electric power by the facilities included in the smart community, such as ordinary houses, public facilities, buildings, and factories, varies from facility to facility. Therefore, the power demand fluctuates inevitably.

For this reason, it is desired that transmission power transmitted from the smart community to the external commercial power system be smoothed in the smart community in accordance with fluctuations in power supply and demand.

There are known methods for smoothing the transmission power transmitted to the external commercial power system. Such methods are disclosed in, for example, Patent Literatures 1 to 3 indicated below.

CITATION LIST

Patent Literature

PTL 1: Japanese Laid-Open Patent Application Publication No. 2002-17044
PTL 2: Japanese Laid-Open Patent Application Publication No. 2008-259357
PTL 3: Japanese Laid-Open Patent Application Publication No. 2010-22122

SUMMARY OF INVENTION

Technical Problem

However, all of the techniques disclosed in the above Patent Literatures require a high-capacity power storage unit to be added to a power generating unit in order to temporarily store electric power generated by the power generating unit. The introduction of such a high-capacity power storage unit causes problems in terms of installation space and introduction cost.

The present invention has been made to solve the above-described problems. An object of the present invention is to provide: a grid controller for use in a smart grid system, the grid controller being capable of effectively smoothing transmission power transmitted to the outside without requiring a high-capacity power storage unit to be additionally introduced; a smart grid system including the grid controller; and a method of controlling the smart grid system.

Solution to Problem

A grid controller for use in a smart grid system according to one aspect of the present invention is a grid controller for use in a smart grid system in which at least one power generating unit and a plurality of power storage units are connected to each other and to an external power system in such a manner as to allow the power generating unit and the plurality of power storage units to transmit electric power to and receive electric power from each other and the external power system, each power storage unit including a power storage part storing electric power and a controller performing charge-discharge control of the power storage part. The grid controller is communicably connected to the controllers of the respective power storage units. The grid controller: obtains transmission power Pall transmitted from the smart grid system to the external power system, the transmission power Pall being a sum of electric power generated by the power generating unit, electric power consumed by loads in the smart grid system, and electric power charged into and discharged from the power storage units; calculates differential power $\Delta P$ between the transmission power Pall and a smoothing operation output Pall', the smoothing operation output Pall' being obtained by performing smoothing operation on the transmission power Pall by using a smoothing filter; and performs control of smoothing the transmission power Pall by performing allocation of the differential power $\Delta P$ of the transmission power Pall in accordance with a charge-discharge state of each of the power storage parts of the plurality of power storage units.

According to the above configuration, the differential power $\Delta P$ between the transmission power Pall transmitted to the external power system and the smoothing operation output Pall' serving as a target value of the smoothing is allocated to the plurality of power storage units. That is, the plurality of power storage units are seen as one virtual power storage unit, and by performing charging or discharging of the power storage parts of the plurality of power storage units, the differential power $\Delta P$ is deducted from or added to the transmission power Pall such that the transmission power Pall becomes the smoothing operation output Pall' (i.e., such that the differential power $\Delta P$ becomes 0). In this manner, the smoothing is performed. At the time, the allocation of the differential power $\Delta P$ is performed in accordance with the charge-discharge state of each of the plurality of power storage units (i.e., in accordance with whether each controller is giving the corresponding power storage part a charge command or a discharge command) Thus, by allocating the differential power $\Delta P$ to the existing power storage units, the transmission power transmitted to the outside can be effectively smoothed without requiring a high-capacity power storage unit to be additionally introduced. Moreover, since the allocation of the differential power ΔP is performed in accordance with the charge-discharge state of each of the power storage units, an influence on the charge-discharge control of the existing power storage units for an originally intended purpose can be suppressed.

In a case where there are a plurality of power storage units to which the differential power ΔP is to be allocated, the grid controller may determine allocation amounts in accordance with magnitudes of charge-discharge command values, the values being set in advance by the controllers corresponding to the power storage parts of the power storage units, in order to adjust an amount of electric power stored in each of the power storage parts of the power storage units to a predetermined charge-discharge target value. Accordingly, the burden of the power allocation for the smoothing can be varied in accordance with the magnitude of the charge-discharge command value, which is predetermined for the originally intended purpose. This makes it possible to further reduce the influence on the charge-discharge control of the existing power storage units for the originally intended purpose.

The grid controller may be configured such that: in a case where the transmission power Pall is less than the smoothing operation output Pall', the grid controller transmits such a control command value as to reduce a charge amount per unit time of a power storage unit whose power storage part is in a charging state among the plurality of power storage units, the grid controller transmitting the control command value to the controller corresponding to the power storage part in a charging state; and in a case where the transmission power Pall is less than the smoothing operation output Pall' even if the charge amount per unit time of the power storage unit whose power storage part is in a charging state among the plurality of power storage units is set to 0, the grid controller transmits such a control command value as to cause electric power stored in the power storage unit whose power storage part is in a charging state to be discharged, the grid controller transmitting the control command value to the controller corresponding to the power storage part in a charging state. Accordingly, in a case where the transmission power Pall is less than the smoothing operation output Pall' (i.e., a case where the transmission power Pall is insufficient), the charge amount per unit time of the power storage unit that is in a charging state is reduced, and thereby electric power in an amount corresponding to the reduction is added to the transmission power Pall. At the time, power storage units that are in a discharging state keep their initial discharge commands As a result, the sum of the absolute amounts of each charge amount per unit time and each discharge amount per unit time is minimized, and thereby power loss due to charging and discharging can be reduced. In addition, in a case where just reducing the charge amount per unit time is not enough to compensate for the differential power ΔP, the control is switched to perform discharge control of the power storage unit that is in a charging state. In this manner, the differential power ΔP is compensated for and the number of power storage units among the plurality of power storage units to which the differential power ΔP is allocated is kept small. This makes it possible to prevent an increase in the influence on the charge-discharge control for the originally intended purpose.

The grid controller may be configured such that in a case where the transmission power Pall is less than the smoothing operation output Pall' even if a discharge amount per unit time of the power storage unit whose power storage part is in a charging state among the plurality of power storage units is increased, the grid controller transmits such a control command value as to increase a discharge amount per unit time of a power storage unit whose power storage part is in a discharging state among the plurality of power storage units, the grid controller transmitting the control command value to the controller corresponding to the power storage part in a discharging state. Accordingly, the transmission power Pall can be effectively smoothed by making the most of the plurality of power storage units.

The grid controller may be configured such that: in a case where the transmission power Pall is greater than the smoothing operation output Pall', the grid controller transmits such a control command value as to reduce a discharge amount per unit time of a power storage unit whose power storage part is in a discharging state among the plurality of power storage units, the grid controller transmitting the control command value to the controller corresponding to the power storage part in a discharging state; and in a case where the transmission power Pall is greater than the smoothing operation output Pall' even if the discharge amount per unit time of the power storage unit whose power storage part is in a discharging state among the plurality of power storage units is set to 0, the grid controller transmits such a control command value as to cause the power storage unit whose power storage part is in a discharging state to be charged with electric power, the grid controller transmitting the control command value to the controller corresponding to the power storage part in a discharging state. Accordingly, in a case where the transmission power Pall is greater than the smoothing operation output Pall' (i.e., a case where the transmission power Pall is excessive), the discharge amount per unit time of the power storage unit that is in a discharging state is reduced, and thereby electric power in an amount corresponding to the reduction is deducted from the transmission power Pall. At the time, power storage units that are in a charging state keep their initial charge commands. As a result, the sum of the absolute amounts of each charge amount per unit time and each discharge amount per unit time is minimized, and thereby power loss due to charging and discharging can be reduced. In addition, in a case where just reducing the discharge amount per unit time is not enough to offset the differential power ΔP, the control is switched to perform charging control of the power storage unit that is in a discharging state. In this manner, the differential power ΔP is reduced, and the number of power storage units among the plurality of power storage units to which the differential power ΔP is allocated is kept small. This makes it possible to prevent an increase in the influence on the charge-discharge control for the originally intended purpose.

The grid controller may be configured such that in a case where the transmission power Pall is greater than the smoothing operation output Pall' even if a charge amount per unit time of the power storage unit whose power storage part is in a discharging state among the plurality of power storage units is increased, the grid controller transmits such a control command value as to increase a charge amount per unit time of a power storage unit whose power storage part is in a charging state among the plurality of power storage units, the grid controller transmitting the control command value to the controller corresponding to the power storage part in a charging state. Accordingly, the transmission power Pall can be effectively smoothed by making the most of the plurality of power storage units.

The grid controller may: separate the plurality of power storage units into a plurality of groups in accordance with usage of each of the power storage units; perform predetermined weighting on the plurality of groups and on a time constant of the smoothing filter; set an evaluation function, in which differences between target values of control command values of the respective groups and control command values to be calculated by the grid controller, and a difference between a target value of the time constant of the smoothing filter and a setting value of the time constant to be calculated by the grid controller, are weighted and averaged based on the predetermined weighting; and calculate the control command values of the respective groups and the setting value of the time constant of the smoothing filter, such that the evaluation function becomes minimum. Accordingly, the influence on the charge-discharge control of the existing power storage units for the originally intended purpose can be minimized by performing the weighting in accordance with the usage of each of the power storage units. Moreover, by changing the weighting in accordance with the usage, usage status, supply-demand balance, and the like of each group of the power storage units, optimal control can be performed at each moment.

The grid controller may: obtain electric power generated by the power generating unit, electric power consumed by the loads in the smart grid system, and electric power charged into and discharged from the power storage units; and calculate the transmission power Pall based on the generated electric power, the consumed electric power, and the charged and discharged electric power, which are obtained.

A smart grid system according to another aspect of the present invention includes: at least one power generating unit connected to an external power system in such a manner as to allow the power generating unit to transmit electric power to and receive electric power from the external power system; a plurality of power storage units connected to the power generating unit and the external power system in such a manner as to allow the plurality of power storage units to transmit electric power to and receive electric power from the power generating unit and the external power system, each of the power storage units including a power storage part storing electric power and a controller performing charge-discharge control of the power storage part; and the grid controller with the above-described configuration.

A method of controlling a smart grid system according to yet another aspect of the present invention is a method of controlling a smart grid system in which at least one power generating unit and a plurality of power storage units are connected to each other and to an external power system in such a manner as to allow the power generating unit and the plurality of power storage units to transmit electric power to and receive electric power from each other and the external power system, each power storage unit including a power storage part storing electric power and a controller performing charge-discharge control of the power storage part. The method includes: obtaining transmission power Pall transmitted from the smart grid system to the external power system, the transmission power Pall being a sum of electric power generated by the power generating unit, electric power consumed by loads in the smart grid system, and electric power charged into and discharged from the power storage units; calculating differential power ΔP between the transmission power Pall and a smoothing operation output Pall', the smoothing operation output Pall' being obtained by performing smoothing operation on the transmission power Pall by using a smoothing filter; and performing control of smoothing the transmission power Pall by performing allocation of the differential power ΔP of the transmission power Pall in accordance with a charge-discharge state of each of the power storage parts of the plurality of power storage units.

The above object, other objects, features, and advantages of the present invention will be made clear by the following detailed description of a preferred embodiment with reference to the accompanying drawings.

Advantageous Effects of Invention

The present invention is configured as described above, and provides an advantage of being able to effectively smooth transmission power transmitted to the outside without requiring a high-capacity power storage unit to be additionally introduced.

DESCRIPTION OF EMBODIMENTS

Figure 1:
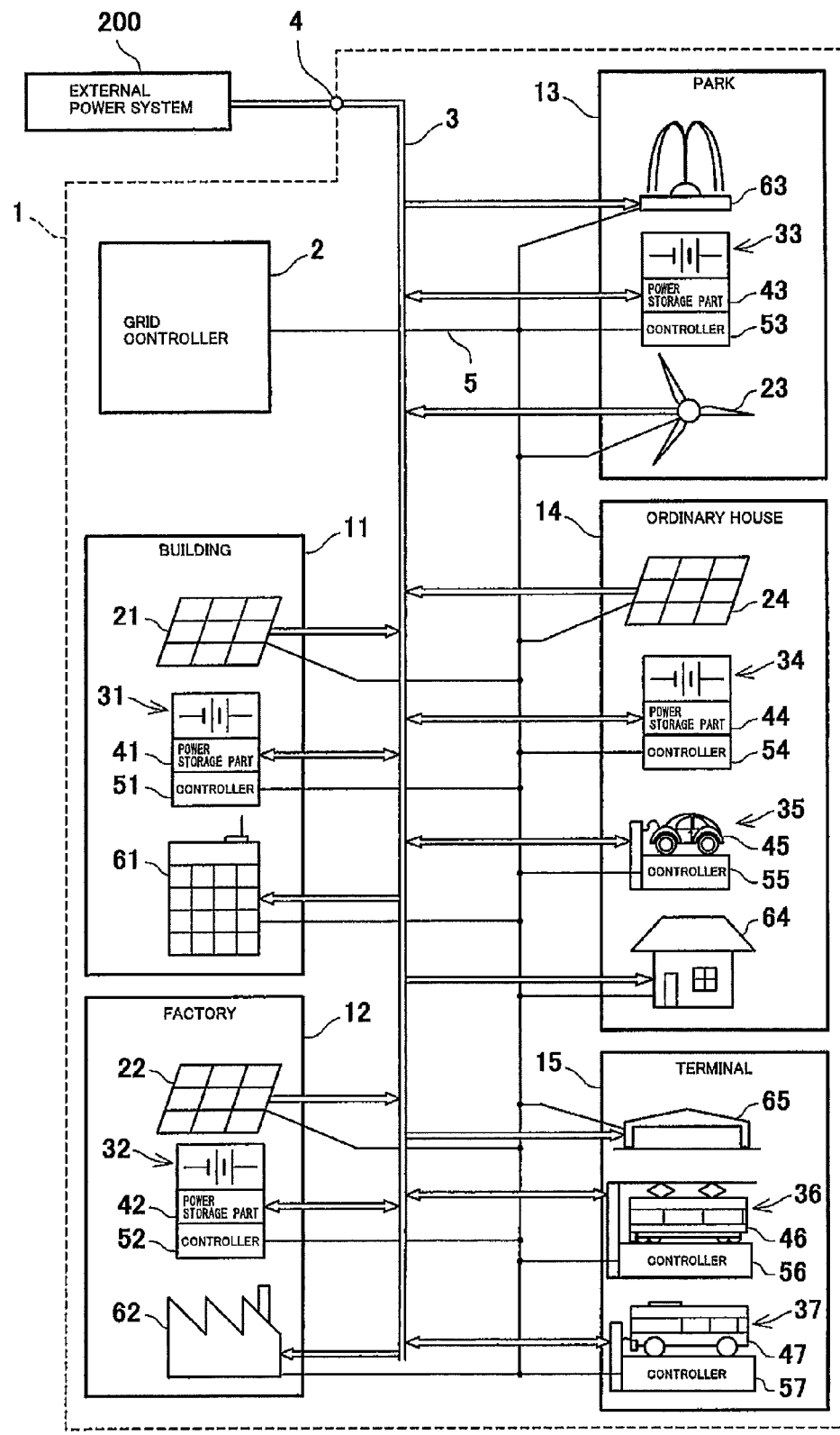
FIG. 1 shows a configuration example of a smart grid system according to one embodiment of the present invention.

Hereinafter, one embodiment of the present invention is described with reference to the drawings. In the drawings, the same or corresponding elements are denoted by the same reference signs, and repeating the same descriptions is avoided below.

First, a schematic configuration of a smart grid system according to the embodiment of the present invention is described. FIG. 1 shows a configuration example of the smart grid system according to the embodiment of the present invention. As shown in FIG. 1, in the smart grid system according to the present embodiment, one or more (in FIG. 1, four) power generating units 21 to 24 and a plurality of (in FIG. 1, seven) power storage units 31 to 37 are connected to each other in such a manner as to allow them to transmit electric power to and receive electric power from each other via a power transmission line 3. The power transmission line 3 is connected in such a manner as to allow electric power to be transmitted and received between an external power system 200 and an interconnection point 4 of each of the power generating units 21 to 24. Loads (power consuming units) 61 to 65 in respective facilities 11 to 15 are connected to the power transmission line 3 in such a manner as to allow each load to receive electric power from a corresponding power generating unit, a corresponding power storage unit, and the external power system 200.

The power storage units 31 to 37 include: power storage parts 41 to 47 storing electric power; and controllers 51 to 57 performing charge-discharge control (SOC control) of the power storage parts 41 to 47.

In FIG. 1, the facility 11 is a building where electric power is consumed by the load 61, which is the lighting or the like of the building. The facility 11 further includes: a solar power generating unit as the power generating unit 21; and a storage battery as the power storage unit 31, which is used for emergency power supply or the like. The facility 12 is a factory where electric power is consumed, for example, to drive a manufacturing machine of the factory as the load 62. The facility 12 further includes: a solar power generating unit as the power generating unit 22; and a storage battery as the power storage unit 32, which is used for peak shaving or the like. The facility 13 is a park where electric power is consumed by the load 63, which is the lighting or the like of the park. The facility 13 further includes: a wind power generating unit as the power generating unit 23; and a storage battery as the power storage unit 33.

The facility 14 is an ordinary house where electric power is consumed, for example, to use an electrical appliance of the house as the load 64. The facility 14 further includes: a solar power generating unit as the power generating unit 24; and a storage battery as the power storage unit 34. Also in the facility 14, an electric vehicle functions as the power storage unit 35 by being connected to a charging unit. That is, in a state where the electric vehicle is connected to the charging unit, the electric vehicle functions as the power storage part 45 of the power storage unit 35, and the charging unit functions as the controller 55 of the power storage unit 35. The facility 15 is a depot (terminal) for an electric railcar and an electric bus. In the facility 15, electric power is consumed by the load 65, which is the lighting or the like of the terminal. Moreover, the facility 15 allows the electric railcar and the electric bus to function as the power storage unit 36 and the power storage unit 37, respectively, when the electric railcar and the electric bus are stopped in the terminal in a state where a storage battery provided in the electric railcar and a storage battery provided in the electric bus can transmit or receive electric power (i.e., a chargeable state). That is, in a state where the storage battery provided in the electric railcar and the storage battery provided in the electric bus are connected to respective charging units, these storage batteries function as the power storage parts 46 and 47 and the charging units function as the controllers 56 and 57.

Each of the power generating units 21 to 24 and each of the controllers 51 to 57 of the power storage units are communicably connected to a grid controller 2 via a network 5. The grid controller 2 is also connected to power meters of the respective loads 61 to 65. The grid controller 2 is configured to obtain the power consumption of each of the loads 61 to 65. The network 5 is not limited to a particular type of network, but may be the Internet, a LAN, a smart meter (a power meter having communication functions), or the like. The network 5 may perform communication by any wired or wireless communication method.

As described above, the plurality of facilities 11 to 15, each of which includes a power generating unit and/or a power storage unit, are communicably connected to the grid controller 2, and thereby a smart community 1 is formed. The smart community 1 can be formed, for example, on a municipal scale or a settlement scale. The grid controller 2 may be installed in, for example, a municipally-owned facility, or provided in any of the facilities 11 to 15 forming the smart community 1. It should be noted that the single smart community 1 may be provided with only one grid controller 2, or may be provided with a plurality of grid controllers 2. If the smart community 1 is provided with a plurality of grid controllers 2, it is preferable that the grid controllers 2 be configured to intercommunicate with each other. It should be noted that the number of and the types of facilities forming the smart community 1 are not limited to the example of FIG. 1, so long as the single smart community 1 includes at least one power generating unit and a plurality of power storage units. For example, the smart community 1 may include a plurality of the same type of facilities, or may include a plurality of different types of facilities.

For each of the controllers 51 to 57 of the power storage units, a target value of the charge-discharge state (SOC: state of charge) of a corresponding one of the power storage parts 41 to 47 is set every predetermined time as a charge-discharge target value (final charging rate) in advance. Based on the charge-discharge target value, each of the controllers 51 to 57 performs charge-discharge control of the corresponding one of the power storage parts 41 to 47. Specifically, each of the controllers 51 to 57 calculates a charge-discharge command value (a necessary charge-discharge amount per unit time for reaching the charge-discharge target value) based on a difference between a charge target value and the amount of electric power currently stored in the corresponding one of the power storage parts 41 to 47. Based on the calculated charge-discharge command value, each of the controllers 51 to 57 performs charge-discharge control, such that the charge amount or discharge amount of the corresponding one of the power storage parts 41 to 47 becomes the charge-discharge target value. Schedules are made for the charge-discharge target values in accordance with the intended use of the power storage units. For example, in the facilities 11 and 14, which are a building and an ordinary house, the charge-discharge target value is scheduled to increase in the nighttime, because the electricity rate can be reduced by storing electric power in the power storage unit 31 and 34 in the nighttime in which the power demand is small. In the facility 12, which is a factory, the charge-discharge target value is scheduled to increase in a period of peak power demand, such as a summer period, so that the factory can operate solely on the electric power stored in the power storage unit 32.

The grid controller 2 obtains transmission power Pall, which is transmitted to the external power system from the smart grid system (the smart community 1). The transmission power Pall is obtained as the sum of electric power generated by the power generating units 21 to 24, electric power consumed by the loads 61 to 65 in the smart grid system, and electric power charged into and discharged from the power storage units 31 to 37. Moreover, the grid controller 2 is configured to: calculate differential power ΔP between the transmission power Pall and a smoothing operation output Pall', the smoothing operation output Pall' being obtained by smoothing the transmission power Pall by using a smoothing filter; and perform control of smoothing the transmission power Pall by performing allocation of the differential power ΔP of the transmission power Pall in accordance with the charge-discharge state of each of the power storage parts 41 to 47 of the plurality of power storage units 31 to 37.

Figure 2:
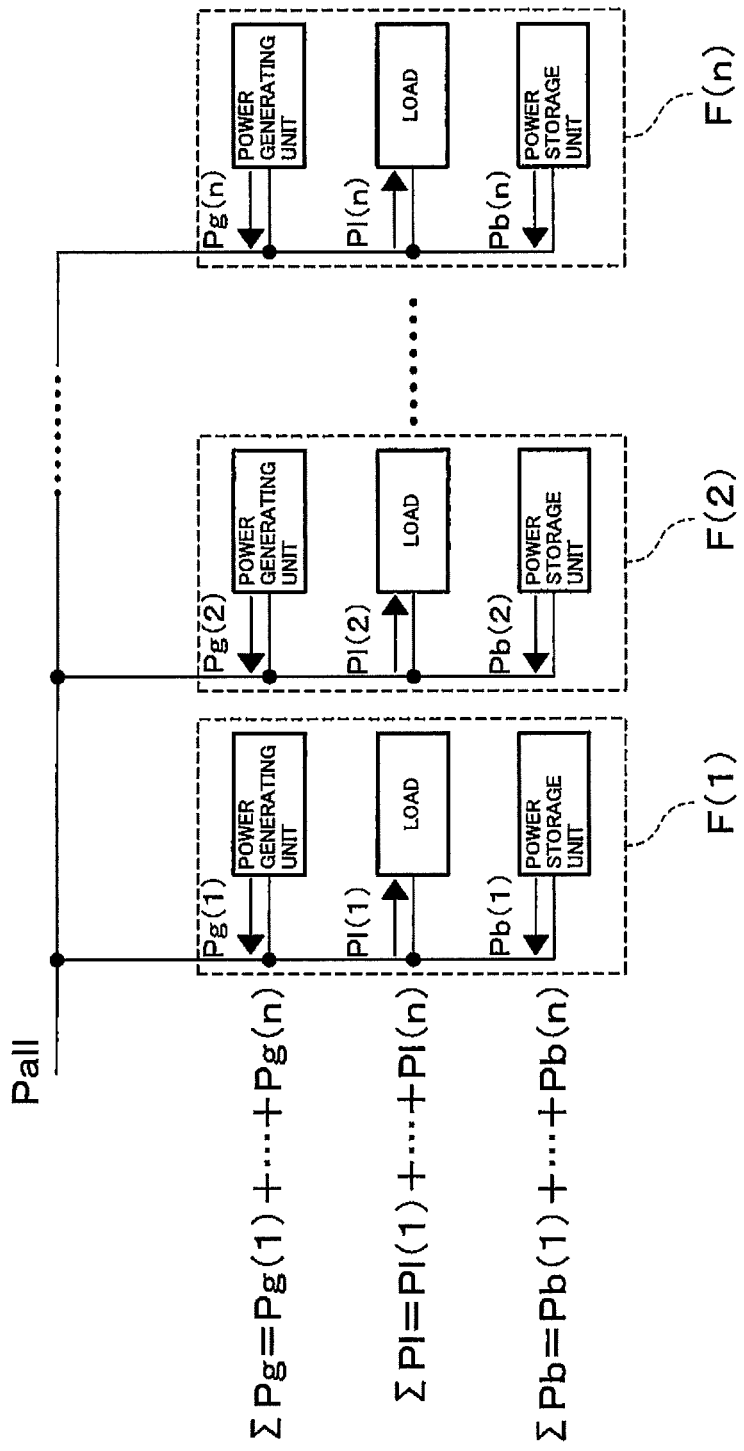
FIG. 2 schematically shows transmission and reception of electric power in the smart grid system shown in FIG. 1.

FIG. 2 schematically shows transmission and reception of electric power in the smart grid system shown in FIG. 1. In FIG. 2, electric power generated by each of the power generating units in the n facilities F(i) (i=1, 2, . . . , n) is represented as Pg(i); electric power consumed by each load is represented as Pl(i); and the charge-discharge command value in each power storage unit is represented as Pb(i). The charge-discharge command value Pb(i) is such that a positive value indicates discharging and a negative value indicates charging. It should be noted that, in order to facilitate the understanding of the description, FIG. 2 illustrates the facilities such that one power generating unit, one load, and one power storage unit are provided in each facility. However, the control described below can be similarly performed also in cases where a plurality of power generating units and a plurality of power storage units (as well as a plurality of controllers of the power storage units) are provided in each facility. It is assumed that Pg(i)=0 if the facility F(i) includes no power generating unit, and Pb(i)=0 if the facility F(i) includes no power storage unit.

If total electric power generated in the smart community 1 is represented as ΣPg=Pg(1)+ . . . +Pg(n), total electric power consumed by the loads is represented as ΣPl=Pl(1)+ . . . +Pl(n), and total charge-discharge command values are represented as ΣPb=Pb(1)+ . . . +Pb(n), then the transmission power Pall (an instantaneous value) at the interconnection point 4 can be represented by the equation below.

$$Pall = \Sigma Pg - \Sigma Pl + \Sigma Pb \quad (1)$$

The grid controller 2 obtains power values by deducting, from electric power generated by the power generating units 21 to 24 of the facilities F(i), electric power consumed by the corresponding loads 61 to 65, and obtains the charge-discharge command values set in the power storage units 31 to 37. Based on the generated electric power, the consumed electric power, and the charge-discharge command values, which are obtained, the grid controller 2 calculates the transmission power Pall (equation 1) at the interconnection point 4. It should be noted that power measuring means may be installed at the interconnection point 4, and thereby the transmission power Pall at the interconnection point 4 may be directly measured.

Figure 3:
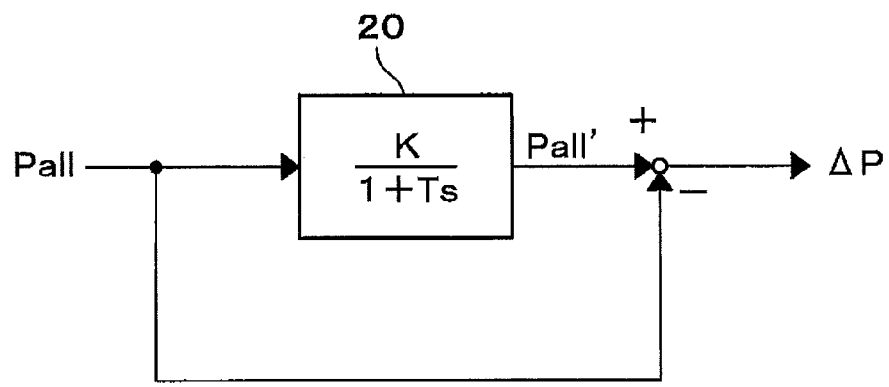
FIG. 3 is a control block diagram including a smoothing filter for smoothing transmission power in the smart grid system shown in FIG. 1.

The grid controller 2 inputs the obtained transmission power Pall to the smoothing filter, thereby performing a smoothing operation to calculate a difference between the input and output. FIG. 3 is a control block diagram including the smoothing filter for smoothing the transmission power in the smart grid system shown in FIG. 1. As shown in FIG. 3, the transmission power Pall is inputted to a smoothing filter 20, and the smoothing operation output Pall' is outputted from the smoothing filter 20. For example, in a case where the smoothing filter 20 is a first order lag system, the transfer function G(s) of the smoothing filter 20 can be represented as $G(s)=K/(1+Ts)$ by using a time constant T and a gain K. It should be noted that the smoothing filter 20 is not limited to this example, so long as the smoothing filter 20 performs the smoothing operation of the transmission power Pall inputted thereto.

Figure 4:
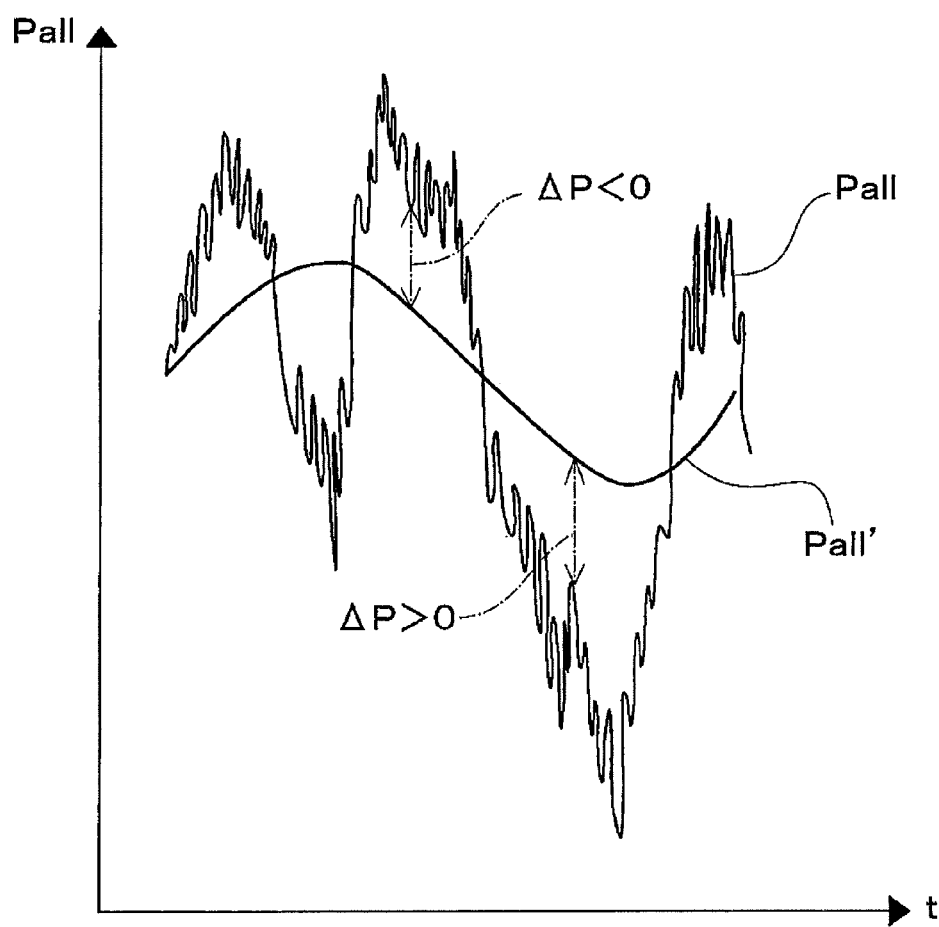
FIG. 4 is a graph showing an example of a relationship between transmission power Pall and a smoothing operation output Pall' in the embodiment.

The grid controller 2 calculates the differential power ΔP between the transmission power Pall and the smoothing operation output Pall' outputted from the smoothing filter 20. That is, the differential power ΔP=Pall'−Pall indicates electric power that is either lacking or excessive for smoothing the transmission power Pall. FIG. 4 is a graph showing an example of a relationship between the transmission power Pall and the smoothing operation output Pall'. As shown in FIG. 4, if the transmission power Pall is less than the smoothing operation output Pall' (i.e., ΔP>0), it represents a state where electric power is lacking for smoothing the transmission power Pall, and if the transmission power Pall is greater than the smoothing operation output Pall' (i.e., ΔP<0), it represents a state where electric power exists excessively for smoothing the transmission power Pall. It should be noted that in a case where the transmission power Pall coincides with the smoothing operation output Pall' (i.e., ΔP=0), the control as described below may be refrained from being performed, or alternatively, the control performed in the case of ΔP>0 or the control performed in the case of ΔP<0 may be performed in the case of ΔP=0.

The grid controller 2 performs allocation of the obtained differential power ΔP in accordance with the charge-discharge state of each of the power storage parts 41 to 47 in the plurality of power storage units, thereby smoothing the transmission power Pall. Specifically, in accordance with whether each of the power storage parts 41 to 47 is in a charging state or is in a discharging state, the grid controller 2 selects power storage units to which the differential power ΔP is preferentially allocated. To be more specific, in a case where the differential power ΔP is a positive value (i.e., a case where the transmission power Pall is less than the smoothing operation output Pall'), the grid controller 2 performs control of allocating the differential power ΔP such that, among the plurality of power storage units including the power storage parts 41 to 47, the differential power ΔP is allocated preferentially to the power storage units whose power storage parts are in a charging state. On the other hand, in a case where the differential power ΔP is a negative value (i.e., a case where the transmission power Pall is greater than the smoothing operation output Pall'), the grid controller 2 performs control of allocating the differential power ΔP such that, among the plurality of power storage units including the power storage parts 41 to 47, the differential power ΔP is allocated preferentially to the power storage units whose power storage parts are in a discharging state.

<Allocation Control 1>

Figure 5:
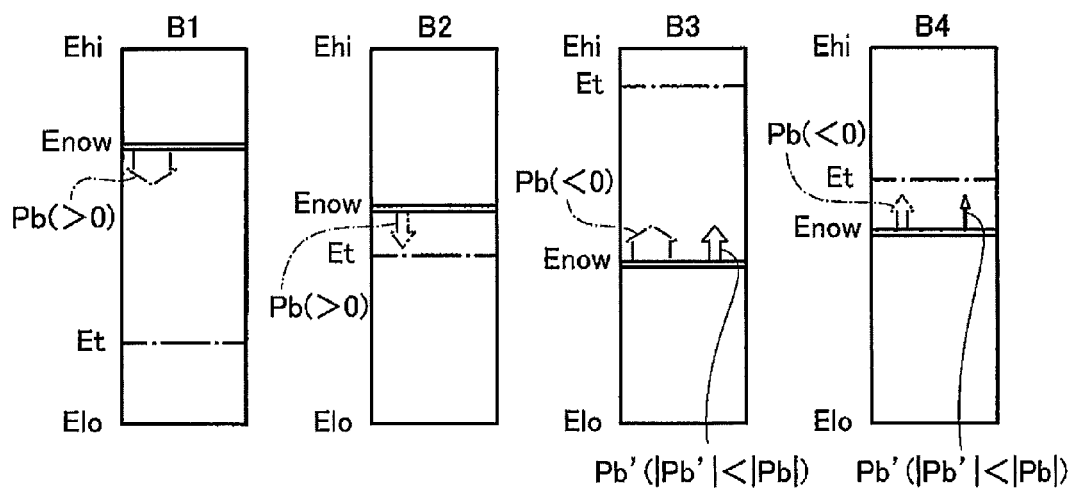
FIG. 5 is a schematic diagram illustratively showing allocation control performed on power storage units when differential power ΔP is a positive value.
Figure 6:
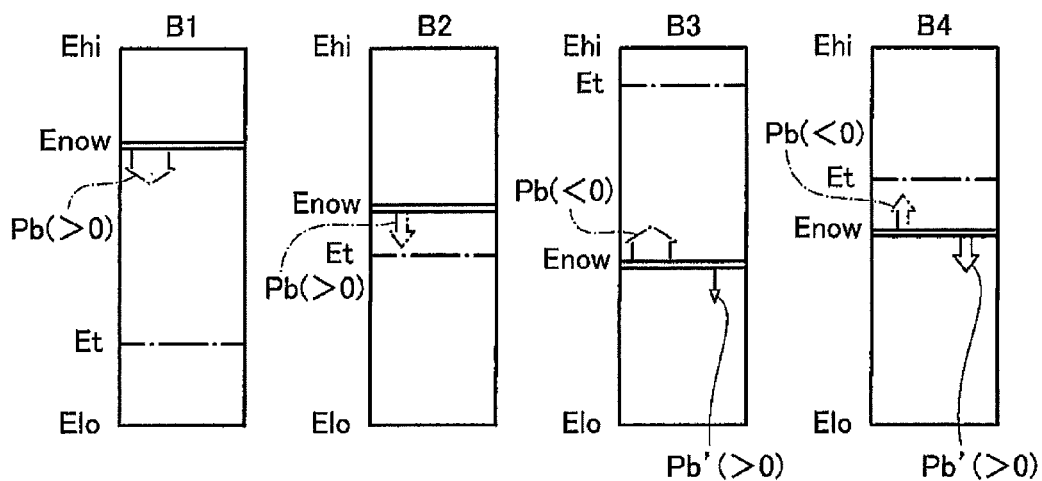
FIG. 6 is a schematic diagram illustratively showing allocation control performed on power storage units when differential power ΔP is a positive value.
Figure 7:
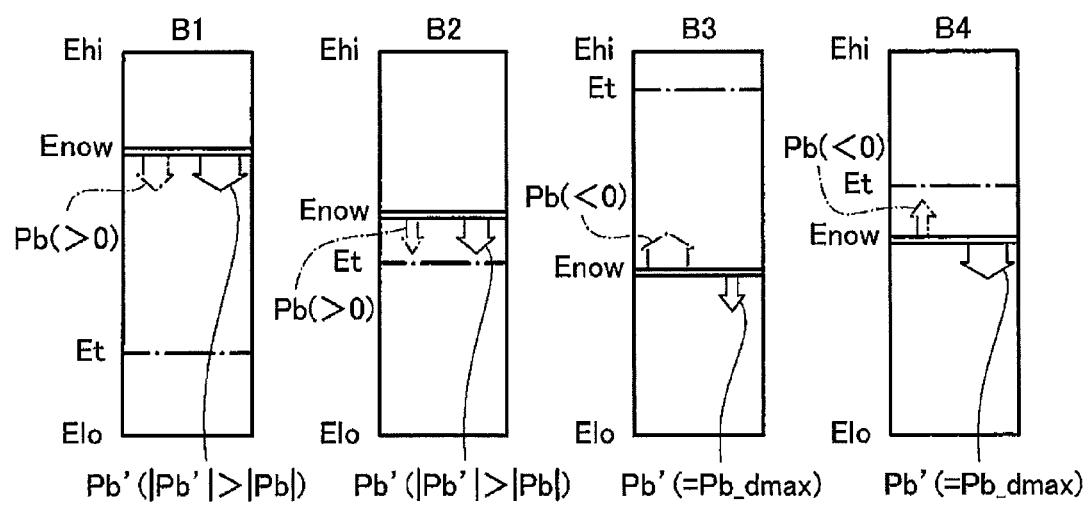
FIG. 7 is a schematic diagram illustratively showing allocation control performed on power storage units when differential power ΔP is a positive value.

Hereinafter, a specific description is given. First, an allocation method performed in a case where the differential power ΔP is a positive value (i.e., a case where the transmission power Pall is less than the smoothing operation output Pall') is described. FIGS. 5 to 7 are schematic diagrams illustratively showing allocation control performed on the power storage units when the differential power ΔP is a positive value. FIGS. 5 to 7 illustratively show a smart community in which there are four power storage units Bi. In the example of FIG. 5 to FIG. 7, power storage units B1 and B2 are in a discharging state (Pb(1), Pb(2)>0), and power storage units B3 and B4 are in a charging state (Pb(3), Pb(4)<0). In FIG. 5 to FIG. 7, the upper limit value of the amount of electric power stored in each power storage unit Bi is represented as Ehi; the lower limit value of the amount of electric power stored in the power storage unit Bi is represented as Elo; the amount of electric power currently stored in the power storage unit Bi is represented as Enow; the charge-discharge target value of the power storage unit Bi is represented as Et; the maximum value of the charge amount per unit time of the power storage unit Bi is represented as Pb_cmax; and the maximum value of the discharge amount per unit time of the power storage unit Bi is represented as Pb_dmax. It should be noted that it is assumed in FIGS. 5 to 7 that the width of each of the arrows indicating charge-discharge command values Pb and control command values Pb' represents a charge-discharge amount per unit time (i.e., the wider the arrow width, the greater the charge-discharge amount per unit time).

Here, if a total discharge command value, which is the sum of discharge command values in all the power storage units that are in a discharging state, is $\Sigma Pb(j)$ (>0), and a total charge command value, which is the sum of charge command values in all the power storage units that are in a charging state, is $\Sigma Pb(k)$ (<0), then a total charge-discharge command value $\Sigma Pb$ can be represented by the equation below.

$$\Sigma Pb \Sigma Pb(j) + \Sigma Pb(k) \qquad (2)$$

In the example of FIG. 5 to FIG. 7, $\Sigma Pb(j)=Pb(1)+Pb(2)$, and $\Sigma Pb(k)=Pb(3)+Pb(4)$.

<Allocation Control 1-A>

In a case where the differential power $\Delta P$ is a positive value (the transmission power Pall is less than the smoothing operation output Pall') (i.e., a case where $|\Delta P|<|\Sigma Pb(k)|$), as shown in FIG. 5, the grid controller 2 transmits such control command values Pb'(k) as to reduce the charge amount per unit time of each of the power storage parts of the power storage units (B3, B4), the power storage parts being in a charging state among the power storage parts of the plurality of power storage units, to the controllers corresponding to the charging power storage parts among the controllers 51 to 57. At the time, it is not necessary to transmit control command values to the power storage units (B1, B2), whose power storage parts are in a discharging state. However, in order to make a distinction from communication errors and the like, the grid controller 2 may transmit discharge command values Pb(j), the values Pb(j) being set in the controllers corresponding to the discharging power storage parts among the controllers 51 to 57, to the discharging power storage units (B1, B2) directly as control command values Pb'(j). That is, the control command value Pb'(j) transmitted to each of the power storage units in a discharging state can be represented by the equation below.

$$Pb'(j)=Pb(j) \qquad (3)$$

Among the controllers 51 to 57, the controllers of the power storage units (B3, B4) in a charging state receive the control command values Pb'(k), update their charge command values with the control command values Pb'(k), respectively, and perform charge-discharge control of the corresponding power storage parts among the power storage parts 41 to 47. As a result, the charge amount per unit time of each of the power storage units B3 and B4 in a charging state is reduced instantaneously. Consequently, surplus power is generated in the smart community 1, and the surplus power is added to the transmission power Pall (i.e., the transmission power Pall becomes close to the smoothing operation output Pall'). Generally speaking, the charge-discharge control of the power storage parts 41 to 47 by the controllers 51 to 57 is such that the charge-discharge target values are reached on the order of hours to days. On the other hand, the control command values transmitted to the power storage parts 41 to 47 by the grid controller 2 for smoothing the transmission power Pall are on the order of minutes at most (i.e., the change cycle of the transmission power Pall is on the order of minutes at most). It can be said that the allocation calculation as described above is performed within a time sufficiently shorter (on the order of seconds at most) than the change cycle of the transmission power Pall. For this reason, it is considered that the influence of the smoothing of the transmission power Pall on the charge-discharge control of the power storage units for an originally intended purpose is sufficiently small, and that delays in the smoothing control relative to changes in the transmission power Pall are ignorable, that is, the smoothing control is sufficiently highly precise.

In a case where there are a plurality of power storage units to which the differential power $\Delta P$ is to be allocated (a case where there are a plurality of power storage units in a charging state) as in the example of FIG. 5, in order to adjust the amount of electric power stored in, among the power storage parts 41 to 47, each of the power storage parts of the charging power storage units to a predetermined charge-discharge target value Et, the grid controller 2 determines allocation amounts in accordance with the magnitudes of charge command values Pb(k) that are set in advance by the controllers corresponding to these power storage parts among the controllers 51 to 57. In this case, the grid controller 2 increases the reduction rate of the charge amount per unit time in accordance with an increase in the absolute value of the charge command value Pb(k). For example, the control command value Pb'(k) transmitted to each of the power storage units (B3, B4) in a charging state can be represented by the equation below.

$$Pb'(k)=Pb(k)+\Delta P \cdot Pb(k)/\Sigma Pb(k) \qquad (4)$$

In the equation (4), the differential power $\Delta P$ is multiplied by (Pb(k)/$\Sigma$Pb(k)), which is the proportion of the initial charge command value Pb(k) of each of the power storage units to the total discharge command value $\Sigma$Pb(k). Since Pb(k)<0 and $\Delta P$>0, the amount of decrease in the absolute value of Pb'(k) relative to the absolute value of Pb(k) is such that the amount of decrease in the absolute value of Pb'(k) increases (the charge amount per unit time decreases) in accordance with an increase in the absolute value of Pb(k). Therefore, the burden of the power allocation for the smoothing can be varied in accordance with the magnitude of the charge command value Pb(k), which is predetermined for the originally intended purpose. This makes it possible to further reduce the influence on the charge-discharge control of the existing power storage units for the originally intended purpose.

<Allocation Control 1-B>

There is a case where even if the charge amount per unit time of all the power storage units (B3, B4) in a charging state is set to 0, the transmission power Pall is less than the smoothing operation output Pall' (i.e., a case where $|\Sigma Pb(k)|<|\Delta P|<|\Sigma Pb(k)|+|\Sigma Pb\_dmax(k)|$). In this case, as shown in FIG. 6, such control command values Pb'(k) as to cause discharging of electric power stored in the power storage units (B3, B4), whose power storage parts are in a charging state, are transmitted to the controllers corresponding to these power storage parts among the controllers 51 to 57. By instantaneously switching the charging state of the power storage units (B3, B4) into the discharging state, surplus power is generated in the smart community 1, and the surplus power is added to the transmission power Pall.

In a case where there are a plurality of power storage units to which the differential power $\Delta P$ is to be allocated (a case where there are a plurality of power storage units that have been in a charging state) as in the example of FIG. 6, the grid controller 2 determines each allocation amount in accordance with the magnitude of the charge-discharge command value Pb(i). In this case, the grid controller 2 reduces the increase rate of the discharge amount per unit time in accordance with an increase in the absolute value of the charge command value Pb(k). For example, the control command value Pb'(k) transmitted to each of the power storage units (B3, B4), which have been in a charging state, can be represented by the equation below.

$$Pb'(k) = (|\Delta P| - |\Sigma Pb(k)|) \cdot 1/Pb(k)/\Sigma(1/Pb(k)) \qquad (5)$$

In the equation (5), the amount of electric power corresponding to the total charge command value $\Sigma Pb(k)$ (<0) is deducted from the differential power $\Delta P$, and the remaining electric power is distributed as a discharge amount per unit time corresponding to the inverse ratio of the charge command value Pb(k). However, as a result of the distribution, if there is a power storage unit whose discharge amount per unit time exceeds the maximum value, then the excess amount is re-distributed among the other power storage units that have been in a charging state and that allow for further discharging. It should be noted that, for the power storage units (B1, B2), whose power storage parts have been in a discharging state, the control performed in the case of $|\Delta P|<|\Sigma Pb(k)|$ is similarly applied.

As described above, in the case where the transmission power Pall is less than the smoothing operation output Pall' (i.e., a case where the transmission power Pall is insufficient), the charge amount per unit time of each of power storage units that are in a charging state is reduced, and thereby electric power in an amount corresponding to the reduction is added to the transmission power Pall. At the time, power storage units that are in a discharging state keep their initial discharge command values. As a result, the sum of the absolute amounts of each charge amount per unit time and each discharge amount per unit time is minimized, and thereby power loss due to charging and discharging can be reduced. In addition, in a case where just reducing the charge amount per unit time is not enough to compensate for the differential power $\Delta P$, the control is switched to perform discharge control of the power storage units that are in a charging state. In this manner, the differential power $\Delta P$ is compensated for, and the number of power storage units among the plurality of power storage units to which the differential power $\Delta P$ is allocated is kept small. This makes it possible to prevent an increase in the influence on the charge-discharge control for the originally intended purpose.

<Allocation Control 1-C>

There is a case where even if the discharge amount per unit time of each of the power storage units (B3, B4), whose power storage parts are in a charging state among the plurality of power storage units, is increased (in this case, maximized), the transmission power Pall is less than the smoothing operation output Pall' (i.e., a case where $|\Sigma Pb(k)|+|\Sigma Pb\_dmax(k)|<|\Delta P|<|\Sigma Pb(k)|+|\Sigma Pb\_dmax(k)|+|\Sigma Pb\_dmax(j)|$). In this case, as shown in FIG. 7, in addition to performing the above control, the grid controller 2 transmits such control command values Pb'(j) as to increase the discharge amount per unit time of each of the power storage units (B1, B2), whose power storage parts are in a discharging state among the plurality of power storage units, to the controllers corresponding to these power storage parts among the controllers 51 to 57. As a result, the discharge amount per unit time of each of the power storage units (B1, B2) in a discharging state increases instantaneously. Consequently, surplus power is generated in the smart community 1, and the surplus power is added to the transmission power Pall. It should be noted that, in the present embodiment, the maximum value of the discharge amount per unit time means the maximum value of electric power that each power storage unit can discharge per unit time. In general, the maximum value of the discharge amount per unit time is defined as the discharge capacity of a power storage unit.

In a case where there are a plurality of power storage units to which the differential power $\Delta P$ is to be allocated (a case where there are a plurality of power storage units that have been in a discharging state) as in the example of FIG. 7, the grid controller 2 determines each allocation amount in accordance with the magnitude of the charge-discharge command value Pb(i). In this case, the grid controller 2 increases the increase rate of the discharge amount per unit time in accordance with an increase in the absolute value of the discharge command value Pb(j). For example, the control command value Pb'(j) transmitted to each of the power storage units (B1, B2), which have been in a discharging state, can be represented by the equation below.

$$Pb'(j) = Pb(j) + (|\Delta P| - |\Sigma Pb(k)| - |\Sigma Pb\_dmax(k)|) \cdot Pb(j)/\Sigma Pb(j) \qquad (6)$$

In the equation (6), the total charge command value $\Sigma Pb(k)$, and the sum $\Sigma Pb\_dmax(k)$ of electric power when the discharge amount per unit time of all the power storage units that have been in a charging state is maximized, are deducted from the differential power $\Delta P$, and the remaining electric power is allocated to the power storage units that have been in a discharging state. At the time, the remaining electric power is multiplied by (Pb(j)/$\Sigma Pb(j)$), which is the proportion of the initial discharge command value Pb(j) of each of the power storage units to the total discharge command value $\Sigma Pb(j)$. Since Pb(j)>0, the amount of increase in the absolute value of Pb'(j) relative to the absolute value of Pb(j) is such that the amount of increase in the absolute value of Pb'(j) increases (the discharge amount per unit time increases) in accordance with an increase in the absolute value of Pb(j). Therefore, the transmission power Pall can be effectively smoothed by making the most of the plurality of power storage units.

It should be noted that, at the time, the grid controller 2 performs control to maximize the discharge amount per unit time of each of the power storage units (B3, B4), which have been in a charging state. Accordingly, the control command value Pb'(k) transmitted to each of the power storage units (B3, B4), which have been in a charging state, can be represented by the equation below.

$$Pb'(k) = Pb\_dmax(k) \qquad (7)$$

<Allocation Control 1-D>

There is a case where even if the discharge amount per unit time of each of the power storage units (B1, B2), whose power storage parts are in a discharging state among the plurality of power storage units, is increased (in this case, maximized), the transmission power Pall is less than the smoothing operation output Pall' (i.e., a case where $|\Sigma Pb(k)|+|\Sigma Pb\_dmax(k)|+|\Sigma Pb\_dmax(j)|<|\Sigma P|$). In this case, the grid controller 2 transmits such control command values Pb'(j) as to maximize the discharge amount per unit time of all the power storage units to the corresponding controllers 51 to 57. In this manner, the transmission power Pall can be brought close to the smoothing operation output Pall'. Accordingly, the control command value Pb'(j) transmitted to each of the power storage units (B1, B2), which have been in a discharging state, can be represented by the equation below.

$$Pb'(j) = Pb\_dmax(j) \qquad (7')$$

<Allocation Control 2>

Figure 8:
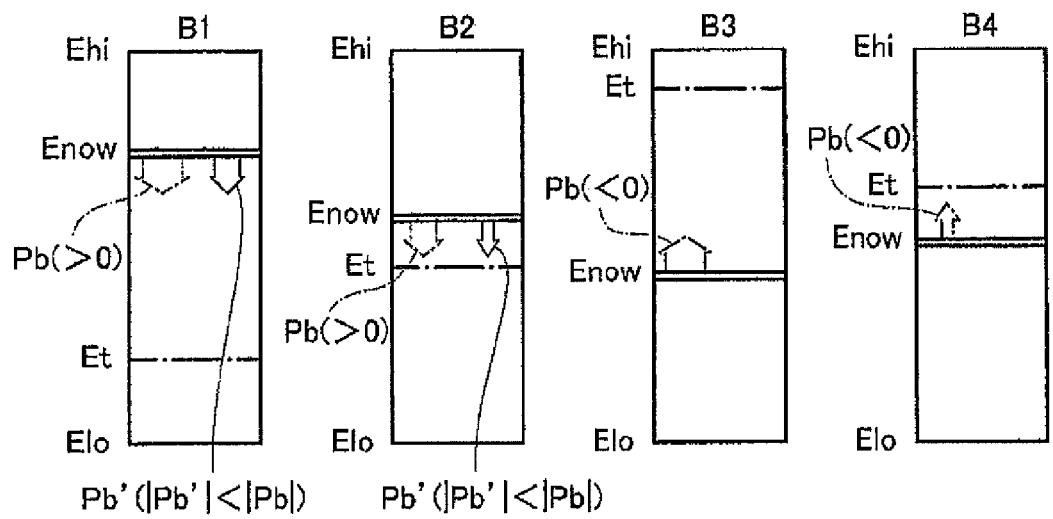
FIG. 8 is a schematic diagram illustratively showing allocation control performed on power storage units when differential power ΔP is a negative value.
Figure 9:
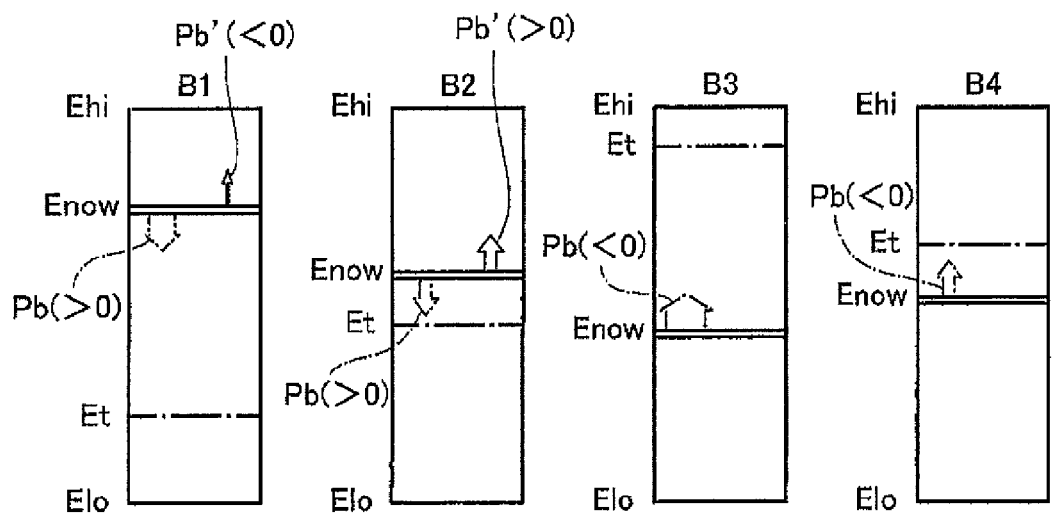
FIG. 9 is a schematic diagram illustratively showing allocation control performed on power storage units when differential power ΔP is a negative value.
Figure 10:
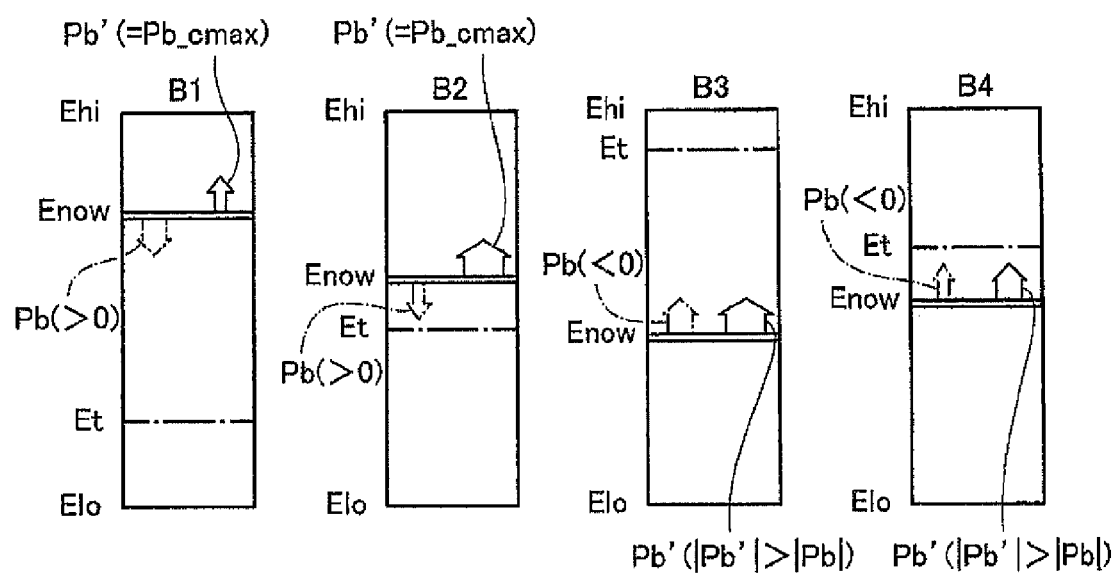
FIG. 10 is a schematic diagram illustratively showing allocation control performed on power storage units when differential power ΔP is a negative value.

Next, an allocation method performed in a case where the differential power ΔP is a negative value (i.e., a case where the transmission power Pall is greater than the smoothing operation output Pall') is described. FIGS. 8 to 10 are schematic diagrams illustratively showing allocation control performed on the power storage units when the differential power ΔP is a negative value. It is assumed that, in FIG. 8 to FIG. 10, the state before the grid controller 2 transmits control command values is the same as in FIG. 5 to FIG. 7. Fundamentally, the control is performed in such a manner that power storage units in a charging state and power storage units in a discharging state in the case where the differential power ΔP is a positive value are switched with each other.

<Allocation Control 2-A>

In a case where the differential power ΔP is a negative value (the transmission power Pall is greater than the smoothing operation output Pall') (i.e., a case where |ΔPB|<|ΣPb(j)|), as shown in FIG. 8, the grid controller 2 transmits such control command values Pb'(j) as to reduce the discharge amount per unit time of each of the power storage parts of the power storage units (B1, B2), the power storage parts being in a discharging state among the power storage parts of the plurality of power storage units, to the controllers corresponding to the discharging power storage parts among the controllers 51 to 57. At the time, it is not necessary to transmit control command values to the power storage units (B3, B4), whose power storage parts are in a charging state. However, in order to make a distinction from communication errors and the like, the grid controller 2 may transmit charge command values Pb(k), the values Pb(k) being set in the controllers corresponding to the charging power storage parts among the controllers 51 to 57, to the charging power storage units (B3, B4) directly as control command values Pb'(k). That is, the control command value Pb'(k) transmitted to each of the power storage units in a charging state can be represented by the equation below.

$$Pb'(k)=Pb(k) \qquad (8)$$

Among the controllers 51 to 57, the controllers of the power storage units (B1, B2) in a discharging state receive the control command values Pb'(j), update their discharge command values with the control command values Pb'(j), respectively, and perform charge-discharge control of the corresponding power storage parts among the power storage parts 41 to 47. As a result, the discharge amount per unit time of each of the power storage units B1 and B2 in a discharging state is reduced instantaneously. Consequently, electric power required in the smart community 1 increases, and the transmission power Pall is reduced (i.e., the transmission power Pall becomes close to the smoothing operation output Pall').

In a case where there are a plurality of power storage units to which the differential power ΔP is to be allocated (a case where there are a plurality of power storage units in a discharging state) as in the example of FIG. 8, in order to adjust the amount of electric power stored in, among the power storage parts 41 to 47, each of the power storage parts of the discharging power storage units to a predetermined charge-discharge target value Et, the grid controller 2 determines allocation amounts in accordance with the magnitudes of discharge command values Pb(j) that are set in advance by the controllers corresponding to these power storage parts among the controllers 51 to 57. In this case, the grid controller 2 increases the reduction rate of the discharge amount per unit time in accordance with an increase in the absolute value of the discharge command value Pb(j). For example, the control command value Pb'(j) transmitted to each of the power storage units (B1, B2) in a discharging state can be represented by the equation below.

$$Pb'(j)=Pb(j)+\Delta P \cdot Pb(j)/\Sigma Pb(j) \qquad (9)$$

In the equation (9), the differential power ΔP is multiplied by (Pb(j)/ΣPb(j)), which is the proportion of the initial discharge command value Pb(j) of each of the power storage units to the total discharge command value ΣPb(j). Since Pb(j)>0 and ΔP<0, the amount of decrease in the absolute value of Pb'(j) relative to the absolute value of Pb(j) is such that the amount of decrease in the absolute value of Pb'(j) increases (the discharge amount per unit time decreases) in accordance with an increase in the absolute value of Pb(j). Therefore, the burden of the power allocation for the smoothing can be varied in accordance with the magnitude of the discharge command value Pb(j), which is predetermined for the originally intended purpose. This makes it possible to further reduce the influence on the charge-discharge control of the existing power storage units for the originally intended purpose.

<Allocation Control 2-B>

There is a case where even if the discharge amount per unit time of all the power storage units (B1, B2) in a discharging state is set to 0, the transmission power Pall is greater than the smoothing operation output Pall' (i.e., a case where |ΣPb(j)|<|ΔP|<|ΣPb(j)|+|ΣPb_cmax(j)Ç). In this case, as shown in FIG. 9, such control command values Pb'(j) as to cause the power storage units (B1, B2), whose power storage parts are in a discharging state, to be charged with electric power are transmitted to the controllers corresponding to these power storage parts among the controllers 51 to 57. By instantaneously switching the discharging state of the power storage units (B1, B2) into the charging state, electric power required in the smart community 1 increases, and the transmission power Pall is reduced.

In a case where there are a plurality of power storage units to which the differential power ΔP is to be allocated (a case where there are a plurality of power storage units that have been in a discharging state) as in the example of FIG. 9, the grid controller 2 determines each allocation amount in accordance with the magnitude of the charge-discharge command value Pb(i). In this case, the grid controller 2 reduces the increase rate of the charge amount per unit time in accordance with an increase in the absolute value of the discharge command value Pb(j). For example, the control command value Pb'(j) transmitted to each of the power storage units (B1, B2), which have been in a discharging state, can be represented by the equation below.

$$Pb'(j)=(-|\Delta P|+|\Sigma Pb(j)|) \cdot 1/Pb(j)/\Sigma(1/Pb(j)) \qquad (10)$$

In the equation (10), the amount of electric power corresponding to the total discharge command value ΣPb(j) (>0) is deducted from the differential power ΔP (<0), and the remaining electric power is distributed as a charge amount per unit time corresponding to the inverse ratio of the discharge command value Pb(j). However, as a result of the distribution, if there is a power storage unit whose charge amount per unit time exceeds the maximum value, then the excess amount is re-distributed among the other power storage units that have been in a discharging state and that allow for further charging. It should be noted that, for the power storage units (B3, B4), whose power storage parts have been in a charging state, the control performed in the case of |ΔP|<|ΣPb(j)| is similarly applied.

As described above, in the case where the transmission power Pall is greater than the smoothing operation output Pall' (a case where the transmission power Pall is excessive), the discharge amount per unit time of each of power storage units that are in a discharging state is reduced, and thereby electric power in an amount corresponding to the reduction is deducted from the transmission power Pall. At the time, power storage units that are in a charging state keep their initial charge command values. As a result, the sum of the absolute amounts of each charge amount per unit time and each discharge amount per unit time is minimized, and thereby power loss due to charging and discharging can be reduced. In addition, in a case where just reducing the discharge amount per unit time is not enough to offset the differential power $\Delta P$, the control is switched to perform charge control of the power storage units that are in a discharging state. In this manner, the differential power $\Delta P$ is reduced, and the number of power storage units among the plurality of power storage units to which the differential power $\Delta P$ is allocated is kept small. This makes it possible to prevent an increase in the influence on the charge-discharge control for the originally intended purpose.

<Allocation Control 2-C>

There is a case where even if the charge amount per unit time of each of the power storage units (B1, B2), whose power storage parts are in a discharging state among the plurality of power storage units, is increased (in this case, maximized), the transmission power Pall is greater than the smoothing operation output Pall' (i.e., a case where $|\Sigma Pb(j)|+|\Sigma Pb\_cmax(j)|<|\Sigma P\Sigma|<|\Sigma Pb(j)|+|\Sigma Pb\_cmax(j)|+|\Sigma Pb\_cmax(k)|$). In this case, as shown in FIG. 10, in addition to performing the above control, the grid controller 2 transmits such control command values Pb'(k) as to increase the charge amount per unit time of each of the power storage units (B3, B4), whose power storage parts are in a charging state among the plurality of power storage units, to the controllers corresponding to these power storage parts among the controllers 51 to 57. As a result, the charge amount per unit time of each of the power storage units (B3, B4) in a charging state increases instantaneously. Consequently, electric power required in in the smart community 1 increases, and the transmission power Pall is reduced. It should be noted that, in the present embodiment, the maximum value of the charge amount per unit time means the maximum value of electric power that each power storage unit can be charged with per unit time. In general, the maximum value of the charge amount per unit time is defined as the discharge capacity of a power storage unit.

In a case where there are a plurality of power storage units to which the differential power $\Delta P$ is to be allocated (a case where there are a plurality of power storage units that have been in a charging state) as in the example of FIG. 10, the grid controller 2 determines each allocation amount in accordance with the magnitude of the charge-discharge command value Pb(i). In this case, the grid controller 2 increases the increase rate of the charge amount per unit time in accordance with an increase in the absolute value of the charge command value Pb(k). For example, the control command value Pb'(k) transmitted to each of the power storage units (B3, B4), which have been in a charging state, can be represented by the equation below.

$$Pb'(k)=Pb(k)+(-|\Delta P|+|\Sigma Pb(j)|+|\Sigma Pb\_cmax(j)|)\cdot Pb(k)/\Sigma Pb(k) \quad (11)$$

In the equation (11), the total discharge command value $\Sigma Pb(j)$, and the sum $\Sigma Pb\_cmax(j)$ of electric power when the charge amount per unit time of all the power storage units that have been in a discharging state is maximized, are deducted from the differential power $\Delta P$, and the remaining electric power is allocated to the power storage units that have been in a charging state. At the time, the remaining electric power is multiplied by ($Pb(k)/\Sigma Pb(k)$), which is the proportion of the initial charge command value Pb(k) of each of the power storage units to the total charge command value $\Sigma Pb(k)$. Since $Pb(k)<0$, the amount of increase in the absolute value of Pb'(k) relative to the absolute value of Pb(k) is such that the amount of increase in the absolute value of Pb'(k) increases (the charge amount per unit time increases) in accordance with an increase in the absolute value of Pb(k). Therefore, the transmission power Pall can be effectively smoothed by making the most of the plurality of power storage units.

It should be noted that, at the time, the grid controller 2 performs control to maximize the charge amount per unit time of each of the power storage units (B1, B2), which have been in a discharging state. Accordingly, the control command value Pb'(j) transmitted to each of the power storage units (B1, B2), which have been in a discharging state, can be represented by the equation below.

$$Pb'(j)=Pb\_cmax(j) \quad (12)$$

<Allocation Control 2-D>

There is a case where even if the charge amount per unit time of each of the power storage units (B3, B4), whose power storage parts are in a charging state among the plurality of power storage units, is increased (in this case, maximized), the transmission power Pall is greater than the smoothing operation output Pall' (i.e., a case where $|\Sigma Pb(j)|+|\Sigma Pb\_cmax(j)|+|\Sigma Pb\_cmax(k)|<|\Delta P|$). In this case, the grid controller 2 transmits such control command values Pb'(k) as to maximize the charge amount per unit time of all the power storage units to the corresponding controllers 51 to 57. In this manner, the transmission power Pall can be brought close to the smoothing operation output Pall'. Accordingly, the control command value Pb'(k) transmitted to each of the power storage units (B3, B4), which have been in a charging state, can be represented by the equation below.

$$Pb'(k)=Pb\_cmax(k) \quad (12')$$

As described above, according to the configuration of the present embodiment, the differential power $\Delta P$ between the transmission power Pall transmitted to the outside and the smoothing operation output Pall' having been smoothed is allocated to the plurality of power storage units 31 to 37. That is, the plurality of power storage units 31 to 37 are seen as one virtual power storage unit, and by performing charging or discharging of the power storage parts 41 to 47 of the plurality of power storage units 31 to 37, the differential power $\Delta P$ is deducted from or added to the transmission power Pall such that the transmission power Pall becomes the smoothing operation output Pall' (i.e., such that the differential power $\Delta P$ becomes 0). In this manner, the smoothing is performed. At the time, the allocation of the differential power $\Delta P$ is performed in accordance with the charge-discharge state of each of the plurality of power storage units 31 to 37 (i.e., in accordance with whether each of the controllers 51 to 57 is giving the corresponding one of the power storage parts 41 to 47 a charge command or a discharge command). Thus, by allocating the differential power $\Delta P$ to the existing power storage units, the transmission power Pall transmitted to the outside can be effectively smoothed without requiring a high-capacity power storage unit to be additionally introduced. Moreover, since the allocation of the differential power ΔP is performed in accordance with the charge-discharge state of each of the power storage units 31 to 37, the influence on the charge-discharge control of the existing power storage units for the originally intended purpose can be suppressed.

It should be noted that, in the present embodiment, as described above, in a case where there are a plurality of power storage units to which the differential power is to be allocated, amounts of power to be allocated are determined in accordance with the magnitudes of the charge-discharge command values Pb(i) of the power storage units. However, the present invention is not thus limited. For example, the differential power ΔP may be evenly allocated to the plurality of power storage units regardless of the magnitudes of the charge-discharge command values Pb(i). Alternatively, the allocation may be performed in order of priority according to the absolute values of the charge-discharge command values (i.e., power storage units with lower priorities are utilized when utilizing only power storage units with higher priorities is insufficient to perform the allocation).

<Variation>

In the allocation control described above, fundamentally, calculation for the smoothing control is performed equally on all the power storage units 31 to 37 in the smart community 1 although there are cases where the differential power ΔP is not allocated to the power storage units 31 to 37 depending on the charge-discharge states of the respective power storage parts 41 to 47. However, depending on the originally intended use of the power storage units 31 to 37, there may be seasons and time periods in which most of the capacity of the power storage parts 41 to 47 of the power storage units 31 to 37 needs to be used for the originally intended use. If the power storage units 31 to 37 include such power storage units, the grid controller 2 may make settings for these power storage units in advance such that the calculation for the smoothing control is not performed on these power storage units in the particular seasons and time periods.

The grid controller 2 may separate the plurality of power storage units 31 to 37 into a plurality of groups in accordance with the usage of each of the power storage units, and perform predetermined weighting on the plurality of groups and on the time constant of the smoothing filter 20. The grid controller 2 may set an evaluation function Y, in which differences between target values Pb(i) of the control command values of the respective groups and control command values Pb'(i) to be calculated by the grid controller 2, and a difference between a target value T of the time constant T of the smoothing filter 20 and a setting value T' of the time constant to be calculated by the grid controller 2, are weighted and averaged based on the predetermined weighting. Then, the grid controller 2 may calculate the control command values Pb'(i) of the respective groups and the setting value T' of the time constant of the smoothing filter 20, such that the evaluation function Y becomes minimum.

Figure 11:
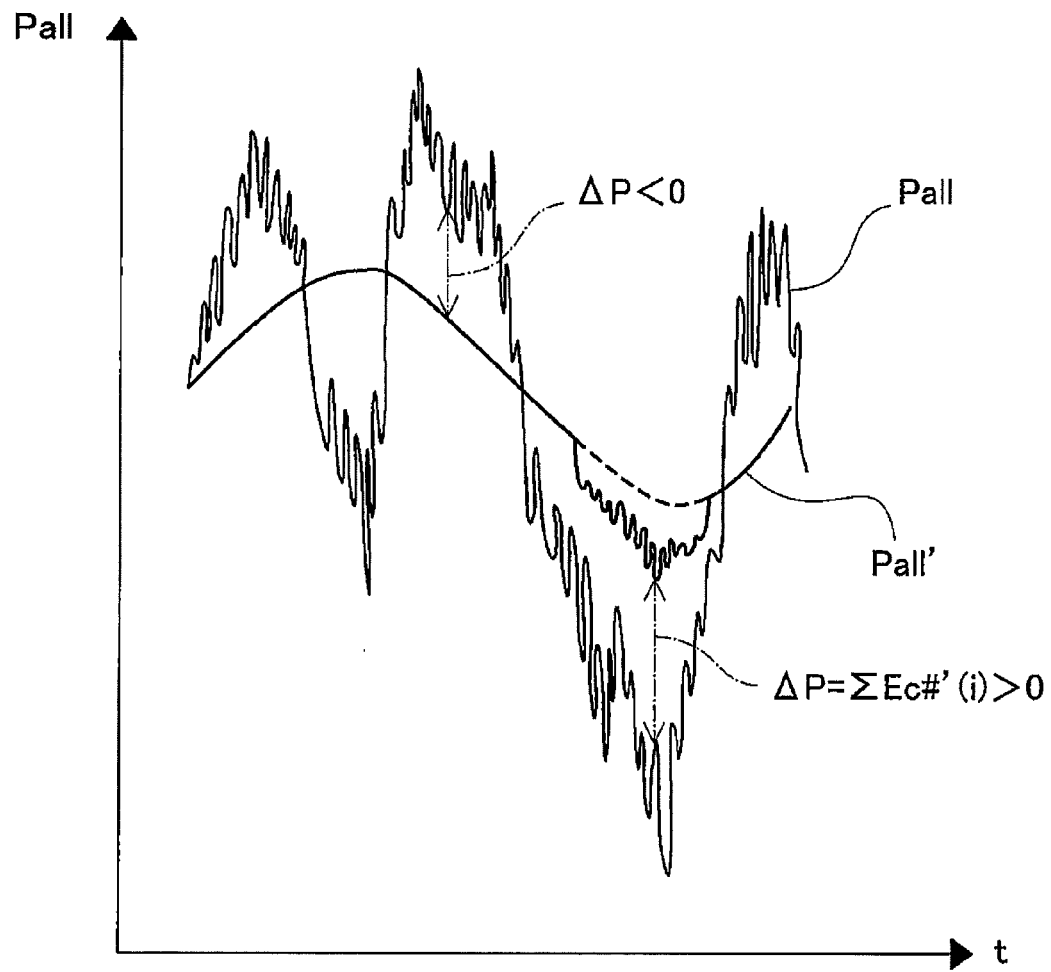
FIG. 11 is a graph showing an example of a relationship between transmission power Pall and a smoothing operation output Pall' in a variation of the embodiment.

FIG. 11 is a graph showing an example of a relationship between the transmission power Pall and the smoothing operation output Pall' in one variation of the present embodiment. For example, in a case where power storage units installed in a factory and the like are intended for peak shaving, the weighting of a group intended for the peak shaving is made greater than the weighting of the other groups and the smoothing filter 20 during time periods and seasons in which the peak shaving is performed (e.g., a period in which the smoothing operation output Pall' is indicated as a wavy-line portion). This makes it possible to prioritize the SOC control of the power storage units (i.e., charge-discharge command values Pb given by the corresponding controllers) for the originally intended purpose, and lower the level of smoothing of the transmission power Pall (perform the smoothing but not to the level indicated by the wavy-line portion of the solid line of Pall' (i.e., not to the level of the differential power ΔP=0)).

In the case of performing such control, first, the plurality of power storage units 31 to 37 are separated into groups in accordance with the usage of each of the power storage units. It should be noted that the meaning of "in accordance with the usage" includes not only separating the storage units into groups based on whether the usages, for example, peak shaving, emergency power supply, vehicle driving, etc., of the storage units are the same or not, but also grouping storage units together when their charge-discharge cycles are similar to each other assuming that their usages are similar to each other.

A target value of the charge-discharge command value of the grouped power storage units (i.e., the charge-discharge command value when the smoothing control is not performed) is represented as Pb# (#=1, 2, . . . , M: group number), and the control command value of the grouped power storage units (i.e., the charge-discharge command value after the smoothing control has been performed) is represented as Pb#'. The sum of the target values of the charge-discharge command values of the respective groups is represented as ΣPb#(i). The sum of the control command values of the respective groups is represented as ΣPb#'(i). A target value of the time constant of the smoothing filter 20 is T (i.e., an ideal value in a case where weighting is not performed), and a setting value of the time constant of the smoothing filter 20 is T'.

Here, the evaluation function Y can be represented by the equation below.

$$Y = K_0(T-T')^2 + K_1(\Sigma Pb1(i) - \Sigma Pb1'(i))^2 + K_2(\Sigma Pb2(i) - \Sigma Pb2'(i))^2 + \ldots + K_M(\Sigma PbM(i) - \Sigma PbM'(i))^2 \quad (13)$$

In the equation, the coefficients $K_0, K_1, \ldots, K_M$ indicate the weight of the smoothing control and the weight of the SOC control in each group. These coefficients $K_0$ to $K_M$ are suitably set in accordance with the usage status in each group (for example, in accordance with a season, time period, or the like). Thus, the evaluation function Y is a function in which all of the following differences are weighted and averaged: the difference between the target value T and the setting value T' of the time constant of the smoothing filter 20; and the difference between the target value Pb# of the charge-discharge command value and the control command value Pb#' in each group.

The grid controller 2 calculates, by retrieval, a combination of optimal solutions (T', ΣPb1', ΣPb2', . . . , ΣPbM') for minimizing the value of the evaluation function Y. A generally-used method, for example, Lagrange's method of undetermined multipliers or a steepest-descent method, may be adopted as a method for retrieving the combination of these optimal solutions.

As a result of the retrieval, the time constant T' and the sum ΣPb#'(i) of the control command values of the respective groups are calculated. Thereafter, the grid controller 2 performs control of allocating the sum ΣPb#'(i) of the control command values of the respective groups to the power storage units belonging to these groups (i.e., calculates control command values Pb#'(1), Pb#'(2), . . . for the power storage parts of the power storage units). Here, the above-described allocation control 1 or 2 is used as a method of performing the allocation. That is, the calculation is similarly performed by using the sum ΣPb#' of the control command values instead of the differential power ΔP, and thereby the control command values Pb#'(i) for the power storage parts of the power storage units are calculated and then transmitted to the corresponding controllers.

According to the above, the influence on the charge-discharge control of the existing power storage units for the originally intended purpose can be minimized by performing the weighting in accordance with the usage of each of the power storage units. Moreover, by changing the weighting in accordance with the usage, usage status, supply-demand balance, and the like of each group of the power storage units, optimal control can be performed at each moment.

Although the embodiment of the present invention has been described above, the present invention is not limited to the above embodiment, and various improvements, alterations, and modifications can be made to the above embodiment without departing from the spirit of the present invention.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structural and/or functional details may be substantially altered without departing from the spirit of the present invention.

INDUSTRIAL APPLICABILITY

The grid controller for use in a smart grid system, the smart grid system including the grid controller, and the method of controlling the smart grid system, according to the present invention, are useful for effectively smoothing transmission power transmitted to the outside without requiring a high-capacity power storage unit to be additionally introduced.

REFERENCE SIGNS LIST 1 smart community
2 grid controller
3 power transmission line
4 interconnection point
5 network
11, 12, 13, 14, 15, F(i) facility
20 smoothing filter
21, 22, 23, 24 power generating unit
31, 32, 33, 34, 35, 36, 37 power storage unit
41, 42, 43, 44, 45, 46, 47, Bi power storage part
51, 52, 53, 54, 55, 56, 57 controller
61, 62, 63, 64, 65 load
200 external power system

The invention claimed is:

1. A grid controller having a hardware processor configured for use in a smart grid system in which at least one power generating unit and a plurality of power storage units are connected to each other and to an external power system in such a manner as to allow the power generating unit and the plurality of power storage units to transmit electric power to and receive electric power from each other and the external power system, each power storage unit including a power storage part storing electric power and a controller performing charge-discharge control of the power storage part, wherein
the grid controller is communicably connected to the controllers of the respective power storage units,
the grid controller:
obtains transmission power Pall transmitted from the smart grid system to the external power system, the transmission power Pall being a sum of electric power generated by the power generating unit, electric power consumed by loads in the smart grid system, and electric power charged into and discharged from the power storage units;
calculates differential power ΔP between the transmission power Pall and a smoothing operation output Pall', the smoothing operation output Pall' being obtained by performing smoothing operation on the transmission power Pall by using a smoothing filter; and
performs control of smoothing the transmission power Pall by performing allocation of the differential power ΔP of the transmission power Pall in accordance with a charge-discharge state of each of the power storage parts of the plurality of power storage units.

2. The grid controller according to claim 1, wherein
in a case where there are a plurality of power storage units to which the differential power ΔP is to be allocated, the grid controller determines allocation amounts in accordance with magnitudes of charge-discharge command values, the values being set in advance by the controllers corresponding to the power storage parts of the power storage units, in order to adjust an amount of electric power stored in each of the power storage parts of the power storage units to a predetermined charge-discharge target value.

3. The grid controller according to claim 1, wherein
the grid controller is configured such that:
in a case where the transmission power Pall is less than the smoothing operation output Pall', the grid controller transmits such a control command value as to reduce a charge amount per unit time of a power storage unit whose power storage part is in a charging state among the plurality of power storage units, the grid controller transmitting the control command value to the controller corresponding to the power storage part in a charging state; and
in a case where the transmission power Pall is less than the smoothing operation output Pall' even if the charge amount per unit time of the power storage unit whose power storage part is in a charging state among the plurality of power storage units is set to 0, the grid controller transmits such a control command value as to cause electric power stored in the power storage unit whose power storage part is in a charging state to be discharged, the grid controller transmitting the control command value to the controller corresponding to the power storage part in a charging state.

4. The grid controller according to claim 3, wherein
the grid controller is configured such that
in a case where the transmission power Pall is less than the smoothing operation output Pall' even if a discharge amount per unit time of the power storage unit whose power storage part is in a charging state among the plurality of power storage units is increased, the grid controller transmits such a control command value as to increase a discharge amount per unit time of a power storage unit whose power storage part is in a discharging state among the plurality of power storage units, the grid controller transmitting the control command value to the controller corresponding to the power storage part in a discharging state.

5. The grid controller according to claim 1, wherein the grid controller is configured such that:

in a case where the transmission power Pall is greater than the smoothing operation output Pall', the grid controller transmits such a control command value as to reduce a discharge amount per unit time of a power storage unit whose power storage part is in a discharging state among the plurality of power storage units, the grid controller transmitting the control command value to the controller corresponding to the power storage part in a discharging state; and in a case where the transmission power Pall is greater than the smoothing operation output Pall' even if the discharge amount per unit time of the power storage unit whose power storage part is in a discharging state among the plurality of power storage units is set to 0, the grid controller transmits such a control command value as to cause the power storage unit whose power storage part is in a discharging state to be charged with electric power, the grid controller transmitting the control command value to the controller corresponding to the power storage part in a discharging state.

6. The grid controller according to claim 5, wherein the grid controller is configured such that in a case where the transmission power Pall is greater than the smoothing operation output Pall' even if a charge amount per unit time of the power storage unit whose power storage part is in a discharging state among the plurality of power storage units is increased, the grid controller transmits such a control command value as to increase a charge amount per unit time of a power storage unit whose power storage part is in a charging state among the plurality of power storage units, the grid controller transmitting the control command value to the controller corresponding to the power storage part in a charging state.

7. The grid controller according to claim 1, wherein the grid controller:

separates the plurality of power storage units into a plurality of groups in accordance with usage of each of the power storage units;

performs predetermined weighting on the plurality of groups and on a time constant of the smoothing filter;

sets an evaluation function, in which differences between target values of control command values of the respective groups and control command values to be calculated by the grid controller, and a difference between a target value of the time constant of the smoothing filter and a setting value of the time constant to be calculated by the grid controller, are weighted and averaged based on the predetermined weighting; and calculates the control command values of the respective groups and the setting value of the time constant of the smoothing filter, such that the evaluation function becomes minimum.

8. The grid controller according to claim 1, wherein the grid controller:

obtains electric power generated by the power generating unit, electric power consumed by the loads in the smart grid system, and electric power charged into and discharged from the power storage units; and calculates the transmission power Pall based on the generated electric power, the consumed electric power, and the charged and discharged electric power, which are obtained.

9. A smart grid system comprising:

at least one power generating unit connected to an external power system in such a manner as to allow the power generating unit to transmit electric power to and receive electric power from the external power system;

a plurality of power storage units connected to the power generating unit and the external power system in such a manner as to allow the plurality of power storage units to transmit electric power to and receive electric power from the power generating unit and the external power system, each of the power storage units including a power storage part storing electric power and a controller performing charge-discharge control of the power storage part; and the grid controller according to claim 1.

10. A method of controlling a smart grid system in which at least one power generating unit and a plurality of power storage units are connected to each other and to an external power system in such a manner as to allow the power generating unit and the plurality of power storage units to transmit electric power to and receive electric power from each other and the external power system, each power storage unit including a power storage part storing electric power and a controller performing charge-discharge control of the power storage part, wherein the method comprising:

obtaining transmission power Pall transmitted from the smart grid system to the external power system, the transmission power Pall being a sum of electric power generated by the power generating unit, electric power consumed by loads in the smart grid system, and electric power charged into and discharged from the power storage units;

calculating differential power $\Delta P$ between the transmission power Pall and a smoothing operation output Pall', the smoothing operation output Pall' being obtained by performing smoothing operation on the transmission power Pall by using a smoothing filter; and performing control of smoothing the transmission power Pall by performing allocation of the differential power $\Delta P$ of the transmission power Pall in accordance with a charge-discharge state of each of the power storage parts of the plurality of power storage units.

* * * * *